United States Patent [19]

Scozzafava et al.

[11] Patent Number: 4,946,235
[45] Date of Patent: Aug. 7, 1990

[54] NONLINEAR OPTICAL WAVEGUIDE DEVICE

[75] Inventors: Michael Scozzafava; Phat T. Dao, both of Rochester; Douglas R. Robello, Webster; Jay S. Schildkraut, Rochester; Craig S. Willand, Pittsford; David J. Williams, Fairport, all of N.Y.

[73] Assignee: Eastman Kodak Company, Rochester, N.Y.

[21] Appl. No.: 419,818

[22] Filed: Oct. 11, 1989

[51] Int. Cl.$^5$ ............................ G02B 6/00; G02B 5/30; H03F 7/00; F21V 9/14

[52] U.S. Cl. ............................. 350/96.34; 350/96.12; 350/96.14; 350/311; 350/370; 350/374; 307/425; 307/427; 307/430; 252/585; 252/582; 428/411.1

[58] Field of Search ................. 350/96.10, 96.11, 96.12, 350/96.13, 96.14, 96.15, 96.30, 96.34, 96.33, 311, 370, 374, 377; 428/411.1; 427/162, 164, 165; 307/425, 427, 430; 430/159, 170, 270, 290, 321, 900, 921; 264/1.1, 1.3, 1.7; 252/582, 585

[56] References Cited

U.S. PATENT DOCUMENTS

| | | | |
|---|---|---|---|
| 4,431,263 | 2/1984 | Garito | 350/96.34 |
| 4,536,450 | 8/1985 | Garito | 428/411.1 |
| 4,707,303 | 11/1987 | Buckley et al. | 252/582 X |
| 4,717,508 | 1/1988 | DeMartino | 350/311 X |
| 4,720,355 | 1/1988 | DeMartino | 350/311 X |
| 4,766,171 | 8/1988 | DeMartino | 350/311 X |
| 4,792,208 | 12/1988 | Ulman et al. | 350/96.34 |
| 4,801,659 | 1/1989 | Leslie | 252/582 X |
| 4,807,968 | 2/1989 | Leslie | 350/311 |
| 4,818,898 | 4/1989 | Anderson et al. | 350/311 |
| 4,855,078 | 8/1989 | Leslie | 252/582 |
| 4,886,339 | 12/1989 | Scozzafava et al. | 350/96.34 |

OTHER PUBLICATIONS

D. J. Williams, "Organic Polymeric and Non-Polymeric Materials with Large Optical Nonlinearities", *Angew. Chem.* Int. Ed. Engl. 23 (1984) 690–703.

Zyss "Nonlinear Organic Materials for Integrated Optics", *Journal of Molecular Electronics*, vol. 1, pp. 25–45, 1985.

J. I. Thackera, G. F. Lipscombe, M. A. Stiller, A. J. Ticknor, and R. Lytel, "Poled Electro-Optic Waveguide Formation in Thin-Film Organic Media", Appl. Phys. Lett. 52 (13), Mar. 28, 1988, pp. 1031–1033.

R. Lytel, G. F. Lipscomb, M. A. Stiller, J. I. Thackera, and A. J. Ticknor, "Organic Electro-Optic Waveguide Modulators and Switches", SPIE vol. 971 Nonlinear Optical Properties of Organic Materials (1988), pp. 218–229.

*Primary Examiner*—Brian Healy
*Attorney, Agent, or Firm*—Carl O. Thomas

[57] ABSTRACT

An optical article is disclosed containing contiguously overlying an organic layer for the nonlinear propagation of electromagnetic radiation an amorphous transmission enhancement layer of at least 0.5 μm in thickness transmissive to the nonlinearly propagated electromagnetic radiation, exhibiting a refractive index less than that of the organic layer, and comprised of a low molecular weight aromatic compound.

12 Claims, 2 Drawing Sheets

NONLINEAR OPTICAL WAVEGUIDE DEVICE

FIELD OF THE INVENTION

The invention relates to optical articles for the nonlinear propagation of electromagnetic radiation.

BACKGROUND OF THE INVENTION

Nonlinear optics is concerned with the interactions of electromagnetic fields in various media to produce new fields altered in phase, frequency, amplitude, or other propagation characteristics from the incident fields. In order to gain an insight into the origin of nonlinear optical effects, the polarization P induced in a molecule by a local electric field E can be expressed by Equation 1:

$$P = \alpha E + \beta E^2 + \gamma E^3 \quad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.
$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \quad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium. $\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)} E$, second order or first nonlinear polarization $\chi^{(2)} E^2$, and third order or second nonlinear polarization $\chi^3 E^3$.

D. J. Williams, "Organic Polymeric and Non-Polymeric Materials with Large Optical Nonlinearities", *Angew. Chem.* Int. Ed. Engl. 23 (1984) 690–703, and Zyss "Nonlinear Organic Materials for Integrated Optics", *Journal of Molecular Electronics*, Vol. 1, pp. 22–45, 1985, disclose a variety of nonlinear optical end uses that can be served by utilizing $\chi^{(2)}$ or $\chi^{(3)}$ properties of a propagation medium.

Interest in nonlinear optical devices has particularly centered on devices relying on second order Polarization susceptibilities. To achieve on a macromolecular level second order polarization ($\chi^{(2)} E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu.

A significant difficulty encountered in finding suitable molecular dipoles for second order polarization effects lies in the molecular requirements that must be satisfied to achieve usefully large values of $\beta$. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are placed in an electric field.

Second order polarization ($\chi^{(2)} E^2$) has been suggested to be useful for a variety of purposes, including optical rectification (converting electromagnetic radiation input into a DC output), generating an electro-optical (Pockels) effect (using combined electromagnetic radiation and DC inputs to alter during their application the refractive index of the medium), phase alteration of electromagnetic radiation, and parametric effects, most notably frequency doubling, also referred to as second harmonic generation (SHG).

For a number of years the materials employed for achieving second order polarization effects were noncentrosymmetric inorganic crystals, such as potassium dihydrogen phosphate and lithium niobate. Williams postulates mathematically and experimentally corroborates second order polarization susceptibilities in organic dipoles equalling and exceeding those of conventional inorganic dipoles.

A number of difficulties have been encountered in attempting to prepare efficient optical devices employing an organic layer for the nonlinear propagation of electromagnetic radiation. If optical transmission is attempted through the organic layer while its upper surface is in direct contact with an electrode or other electrical conductor, significant optical losses are incurred. An optically passive layer over the organic layer has been suggested to enhance transmission efficiency. Such arrangements are disclosed by Ulman et al. U.S. Pat. No. 4,792,208, for example.

There are several difficulties involved. First, common inorganic deposition techniques, such as sputtering, molecular beam epitaxy, chemical vapor deposition, and the like, produce comparatively thin layers that are optically inefficient in reducing electromagnetic energy losses.

While there are varied techniques available for the deposition of thicker organic protective overcoats, organic nonlinear optical propagation media are susceptible to degradation by overcoating by conventional organic overcoating techniques. High deposition temperatures are precluded by the thermal stability limitations of organic nonlinear propagation media. Solvent coatings onto organic nonlinear optical propagation media can disturb the molecular alignment within the organic propagation layer, particularly in those forms requiring molecular alignment. Also, the organic layer is susceptible to degradation by dissolution in the coating solvent.

Further, the organic propagation media and overcoating materials can crystallize as solvent is removed, leading to radiation scattering on transmission.

J. I. Thackera, G. F. Lipscomb, M. A. Stiller, A. J. Ticknor, and R. Lytel, "Poled Electro-Optic Waveguide Formation in Thin-Film Organic Media", Appl. Phys. Lett. 52 (13), Mar. 28, 1988, pp. 1031–1033, and, by the same authors, "Organic Electro-Optic Waveguide Modulators and Switches" SPIE Vol. 971 Nonlinear Optical Properties of Organic Materials (1988), pp. 218–229, are examples of attempt organic overcoats in combination with organic nonlinear optical propagation layers.

RELATED PATENT APPLICATIONS

Brazas et al. U.S. Ser. No. 273,785, filed Nov. 21, 1988, pending, commonly assigned, discloses depositing on a support an optical conduction layer of a low molecular weight organic compound having a glass transition temperature above about 50° C. In one form an overlying portion of the layer has a differing refractive index than the underlying portion and is patterned to form an optical element.

Rider et al. HIGH $\chi^{(2)}$ OPTICAL ARTICLE U.S. Ser. No. 419,984, pending, concurrently filed, commonly assigned, discloses the use of metal fluoride and oxide layers of thicknesses of less than 0.1 $\mu$m between a conductive layer containing a metal of a moderate work function and poled polymeric medium having a glass transition temperature of at least 50° C.

Dao HIGH $\chi^{(2)}$ OPTICAL ARTICLE WITH IMPROVED BUFFER LAYER U.S. Ser. No. 491,819, pending, concurrently filed, commonly assigned, discloses an optical article with a high $\chi^{(2)}$ poled polymeric medium formed on a buffer layer comprised of low molecular weight aromatic compound and a metal fluoride or oxide.

Schildkraut et al. OPTICAL ARTICLE FOR REFLECTION MODULATION U.S. Ser. No. 419,817, pending, concurrently filed, commonly assigned, discloses an optical article intended for modulation of reflected electromagnetic radiation comprised of a prism support onto which are formed in sequence (a) layer formed of at least one of a metal fluoride or oxide or a low molecular weight aromatic compound, (b) a negative dielectric constant layer, (c) a layer exhibiting a change in its refractive index as a function of a potential bias impressed upon it, and (d) an electrode.

SUMMARY OF THE INVENTION

In one aspect this invention is directed to an optical article comprised of an organic layer for the nonlinear propagation of electromagnetic radiation and a transmission enhancement layer contiguously overlying the organic layer.

The invention is characterized in that the transmission enhancement layer is an amorphous layer of at least 0.5 $\mu$m in thickness transmissive to the nonlinearly propagated electromagnetic radiation, exhibiting a refractive index less than that of said organic layer, and comprised of a low molecular weight aromatic compound.

BRIEF DESCRIPTION OF THE DRAWINGS

The invention can be better appreciated by reference to the following detailed description considered in conjunction with the drawings, in which.

DESCRIPTION OF THE PREFERRED EMBODIMENTS

The invention is applicable to the propagation of electromagnetic radiation in the wavelength ranges commonly encountered by nonlinear optical articles—e.g., wavelengths ranging from the near ultraviolet, typically 300 to 400 nm, through the visible of 400 to 700 nm and well into the infrared up to wavelengths of 2.0 $\mu$m or more. The optical articles of the invention are particularly useful with solid state lasers providing input wavelengths in the range from about 550 to 1500 nm. Second harmonic wavelengths internally generated are, of course, half the input radiation wavelengths.

Figure 1:
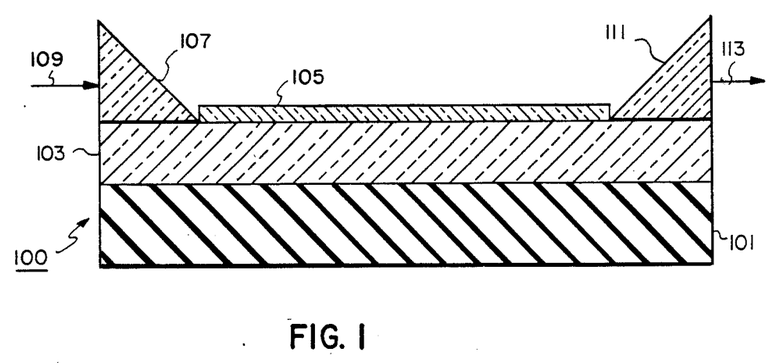
FIG. 1 is a schematic view of one embodiment of a nonlinear optical device according to the invention.

In FIG. 1 an optical article 100 capable of the nonlinear transmission of electromagnetic radiation is shown. The optical article is comprised of an electrically insulative support 101, such as a glass plate or flexible polymeric film. On the film is an organic layer 103 for the nonlinear transmission of electromagnetic radiation. Since the organic film is deposited directly on the electrically insulative support, electrical poling of the organic layer to create an internal molecular alignment favorable for high second order polarization susceptibility is not practical and other techniques for preparing the organic layer for high $\chi^{(2)}$ properties that do not require the application of an electrical field are contemplated. The organic layer can take the form of an X, Y, or Z Langmuir Blodgett film assembly. Alternatively, the organic layer can be prepared as a self assembled sequence of molecular monolayers of the type disclosed by Ulman et al., cited above and here incorporated by reference.

Contiguously overlying the organic layer for the nonlinear transmission of electromagnetic radiation is a transmission enhancement layer 105. Overlying the transmission enhancement layer is an input means 107, such as a prism, for the introduction of incoming electromagnetic radiation, indicated by arrow 109 into the organic nonlinear transmission layer, and an output means 111, such as a prism, for delivery from the device of electromagnetic radiation, indicated by arrow 113.

The transmission enhancement layer exhibits a refractive index less than that of the organic layer, measured at the initial and any harmonic frequencies of the electromagnetic radiation being propagated. By selecting the transmission enhancement layer so that it exhibits a lower refractive index than the organic nonlinear transmission layer, radiation being transmitted within the organic layer impinging on the transmission enhancement layer is for the most part reflected back into the organic layer.

However, a portion of the electromagnetic wavefront nevertheless enters the transmission enhancement layer. To contain the entering electromagnetic wavefront and minimize electromagnetic energy losses, the transmission layer must be at least 0.5 $\mu$m in thickness, usually from 1 to 10 $\mu$m (optimally 1 to 5 $\mu$m) in thickness. Thus, it is the combination of the refractive index of the transmission enhancement layer and its thickness that renders it effective.

In addition, the transmission enhancement layer is chosen to be transmissive to the nonlinearly propagated electromagnetic radiation, including any second and/or third harmonic wavelengths that are generated during transmission. To minimize transmission losses the transmission enhancement layer should not absorb any significant amount of electromagnetic radiation at the wavelengths being propagated.

A further requirement of the transmission enhancement layer is that it must be amorphous. This is to avoid scattering of electromagnetic radiation encountering microcrystalline boundaries within the layer.

A still further requirement of the transmission enhancement layer is that it must be capable of deposition directly on the underlying organic layer without physically damaging this layer or otherwise diminishing its nonlinear optical propagation properties.

Taken together, the combination of properties the transmission enhancement layer must satisfy are both demanding and difficult to achieve in practice.

Figure 2:
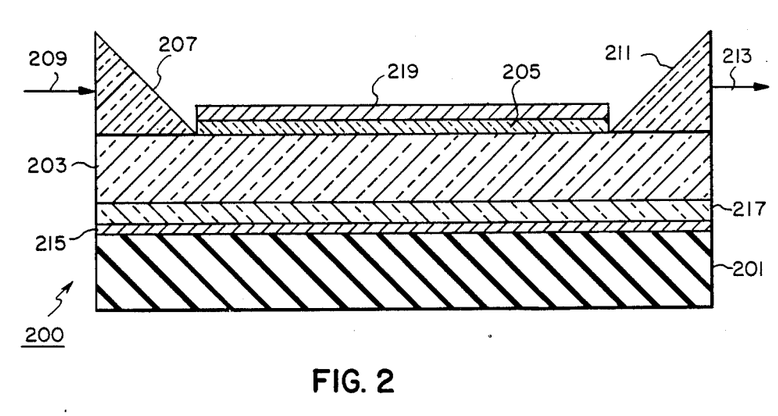
FIG. 2 is a schematic view of a preferred embodiment of a nonlinear optical device according to the invention.

In FIG. 2, a preferred nonlinear optical device 200 is illustrated that requires all of the properties in the transmission enhancement layer discussed above and, in some constructions, places still further requirements on the transmission enhancement layer. Except as specifically noted, the elements assigned 200 series reference numerals are identical to elements assigned corresponding 100 series reference numerals.

Overlying the insulative support 201 is a conductive layer 215. Together the support and the conductive layer form a poling electrode for the device. In a preferred form the poling electrode consists of a conductive indium tin oxide layer vacuum vapor deposited on glass. Any other stable, readily deposited conductive material can be substituted for indium tin oxide. For example, gold, silver, copper, or any of the conventional integrated circuit contact metallizations can be substituted. It is recognized that the poling electrode can, if desired, be a unitary conductive element. For example, the poling electrode can be a copper or aluminum plate. Any conventional poling electrode can be employed. Since poling involves heating well above ambient temperatures, it is contemplated to form the poling electrode of materials that are stable of temperatures up to at least 150° C., preferably at least 200° C.

To avoid the optical losses that are inherent in placing the organic nonlinear propagation layer 203 in direct contact with an electrical conductor, an optional electrically insulative underlying buffer layer 217 is interposed between the poling electrode and the organic layer. While any convenient conventional underlying buffer layer can be employed, in a specifically preferred form the underlying buffer layer is within the thickness ranges set out above for the transmission enhancement layer and is constructed according to the teachings of Scozzafava et al. U.S. Ser. No. 419,819, concurrently filed and commonly assigned, titled HIGH $\chi^{(2)}$ OPTICAL ARTICLE WITH IMPROVED BUFFER LAYER.

Once the poling electrode and underlying buffer layer have been formed, the organic nonlinear propagation layer 203 can be formed. This layer can, of course, take the form of a Langmuir Blodgett assembly or self assembled sequence of molecular monolayers, even though poling is not employed to form these layers. For example, the electrode can be used for purposes other than poling, as described below.

The advantage of forming a device including a poling electrode is that the organic nonlinear propagation layer can be of a type formed by poling. That is, the layer can take the form of a polymeric layer that upon being subjected to a potential bias across the organic layer achieves alignment of incorporated molecular dipoles leading to high second order polarization susceptibilities. The molecular dipoles can be immobilized in their aligned arrangement so that they remain in that orientation after the potential bias is removed by employing a linear polymer in the polymeric layer that exhibits a glass transition temperature ($T_g$) well above ambient temperatures and poling at temperatures above the glass transition temperature. A typical fabrication is to solvent cast the organic polymer on the poling electrode, usually by spin coating. Upon solvent evaporation, a solid organic layer is left which, following heating above its softening temperature (i.e., its glass transition temperature $T_g$), DC biasing while heated to align its molecular dipoles, and cooling to below its $T_g$ with the DC bias being maintained, produces an organic nonlinear propagation layer exhibiting a high second order polarization susceptibility.

An alternative approach is to pole using monomers or lower molecular weight polymers having $T_g$ values below ambient, instead of heating to achieve the mobility required for alignment and cooling to ambient to immobile the molecular dipoles in alignment, the monomers or lower molecular weight polymers can be polymerized further to form higher molecular weight polymers or a crosslinked polymeric matrix capable of immobilizing the molecular dipoles in their polar aligned arrangement.

One common approach to poling is plasma poling. In this approach poling can be undertaken prior to overcoating the organic layer. A DC bias is established between the poling electrode and a second electrode (not shown, since it forms no part of the completed device) spaced above the surface of the organic layer. When a potential gradient is applied of sufficient magnitude to ionize the gaseous media above the upper surface of the organic layer, the ions of a polarity opposite that of the poling electrode are attracted to the surface of the organic layer and serve the function of a counter electrode. The transmission enhancement layer 205 is formed on the surface of the organic layer after poling. In this form the transmission enhancement layer 205 can be identical in its properties to corresponding layer 105. When plasma poling is undertaken, the second electrode 219 is included as part of the device only when it is required to serve a function other than poling.

An alternative poling technique is to form the transmission enhancement layer 205 over the organic layer 203 prior to poling. The second electrode 219 is then formed over the transmission enhancement layer to allow poling. The second electrode can take the form of any conventional overlying poling electrode. The second electrode can be formed by any convenient conventional low temperature deposition technique. In most instances the second electrode takes the form of a vacuum vapor deposited metal layer, such as described above in connection with conductive layer 215.

For efficient poling it is desired to have a large portion of the total voltage drop across layers 203 and 205 appear as a voltage drop in the organic layer 203. To accomplish this the resistance of the transmission enhancement layer should be kept as low as possible in relation to the resistance of the organic layer during poling. Since in the fluid state required for poling the organic layer is more conductive than it is in solidified state after poling, it is preferred to conduct poling with the transmission enhancement layer heated above its glass transition temperature, thereby also increasing its conductivity and lowering the voltage drop that appears across this layer during poling.

In considering the requirements of poling, it is appreciated that the organic layer must have a $T_g$ that is below its thermal degradation temperature. At the same time, to lock the molecular dipoles into their aligned position after cooling to ambient temperature, it is necessary that the organic layer exhibit a $T_g$ of at least about 50° C. Since the transmission enhancement layer must exhibit a $T_g$ at least equal to and preferably higher than that of the organic layer when present during poling, this requires the $T_g$ of the transmission enhancement layer 205 to be at least 50° C., but preferably at least 20° C. higher than that of the organic layer.

In each of optical devices 100 and 200 electromagnetic radiation 109 or 209 is supplied to the device through input means 109 and 209 and nonlinearly transmitted electromagnetic radiation 113 or 213 is received from the device throughout means 111 and 211. It is recognized that an electrical output rather than an optical output can be realized.

Figure 3:
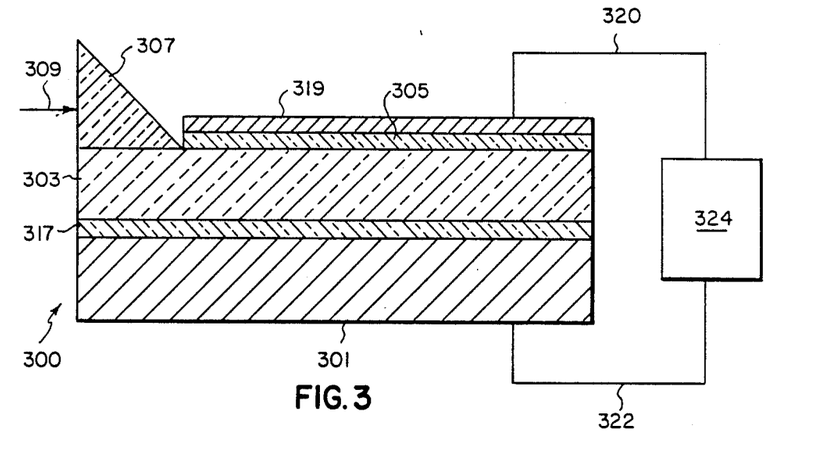
FIG. 3 is a schematic view of a nonlinear optical device capable of performing an electromagnetic to electrical energy conversion.

In FIG. 3 an optical device 300 capable of producing an electrical output is shown. Again, except as specifically noted, elements assigned 300 series reference numerals are identical to elements assigned corresponding 100 and 200 series reference numerals.

Unitary conductive electrode 301 also serves as a base for construction of the device. The following electrode (elements 201 and 215) of device 200 can, of course, be substituted for electrode 301. The underlying layer 317 can be identical to layer 217 and serves the same function. Organic layer 303 can be fabricated by any of the techniques described in connection with organic layers 103 and 203. The transmission enhancement layer 305 can take any of the forms of layers 105 and 205. The electrode 319 can correspond to electrode 219 in construction.

Electromagnetic radiation 309 enters the device through input means 307. Electromagnetic radiation as it is propagated through the organic layer stimulates an electrical energy waveform that can be sensed as a potential difference between electrodes 301 and 319. This potential difference is attributable to the nonlinear optical properties of the organic layer. The variance in the potential difference can be sensed and applied, as indicated schematically at 324.

It has been discovered that materials particularly well suited for satisfying each of the varied requirements of the transmission enhancement layer are amorphous low molecular weight aromatic compounds.

By "amorphous" it is meant that there is substantially no crystallinity in the layer or microstructure attributed to the coating process. This can be determined by visual inspection under a microscope; by Raman spectroscopic techniques; or by the observation of scattered light from the waveguide or device.

The term "low molecular weight" is employed to designate those aromatic compounds having a molecular weight below about 1000. In other words, film forming polymers, which typically have a molecular weight of at least 5000, are excluded.

Low molecular weight aromatic compounds whose vapor pressure is sufficiently high so that the compound can be vacuum deposited are preferred.

Low molecular weight aromatic compounds are useful in the present invention are solids at room temperature. They preferably have a glass transition temperature of greater than about 50° C. Glass transition temperature is measured using conventional techniques, such as differential scanning calorimetry. The measurement should be taken from amorphous bulk material that is substantially free from residual solvents and decomposition products since that is the condition of the materials when they are vacuum coated.

The low molecular weight aromatic compounds that form the transparent layers 105, 205, and 305 described herein contain at least one aromatic carbocyclic or heterocyclic ring. In a preferred form the compounds can be the "multicyclic aromatic nucleus" compounds described in U.S. Pat. No. 4,499,165 or derivatives thereof.

A "multicyclic aromatic nucleus" is a nucleus comprising at least two cyclic groups one of which is aromatic, including aromatic hetercyclic ring groups. The cyclic group may be substituted with substituents such as aliphatic hydrocarbons, including cycloaliphatic hydrocarbons, other aromatic ring groups such as aryl, and heterocyclic ring groups such as substituted or fused thiazole oxazole, imide, pyrazole, triazole, oxadiazole, pyridine, pyrimidine, pyrazine, triazine, tetrazine and quinoline groups. The substituents are fused or non fused and mono or polycyclic. Examples of multicyclic aromatic nuclei include 9,9-bis(4-hydroxy-3,5-dichlorophenyl)fluorene, 4,4'-hexahydro-4,7-methanoindan-5-ylidene-bis(2,6-dichlorophenyl); 9,9-bis(4-hydroxy-3,5-dibromophenyl)-fluorene, 4,4'-hexahydro-4,7-methanoindan-5-ylidene-bis(2,6-dibromophenol); 3',3'',5',5''-tetrabromophenol-phthalein, 9,9-bis(4-aminophenyl)fluorene, phenylindandiols; 1,1'-spirobiindandiols, 1,1'-spirobiindandiamines, 2,2'-spirobichromans; 7,7-dimethyl-7H-di-benzo[c,h]xanthenediol; 9,9-dimethylxanthene-3,6-bis-(oxyacetic acids); 4,4'-(3-phenyl-1-indanylidene)di-phenol and other bisphenols; 9-phenyl-3-oxo-2,6,7-trihydroxyxanthene; and the like.

Useful multicyclic aromatic nuclei compounds are:

A. The phenylindan diols disclosed in *Research Disclosure*, Item No. 11833, February 1974, and U.S. Pat. Nos. 3,803,096, 3,859,364 and 3,886,124 and the phenylindan diamines of U.S. Pat. Nos. 3,897,253 and 3,915,939, B. The 1,1'-spirobiindan diols and diamines disclosed in U.S. Pat. No. 3,725,070; and the 1,1'-spirobiindan (dicarboxylic acids) of *Research Disclosure*, Item No. 9830, June 1972 (anonymous), C. The 1,1'-spirobiindan-5,5'-diamines disclosed in *Research Disclosure*, Item No. 13117, March 1975, D. The 2,2'-spirobichromans disclosed in U.S. Pat. No. 3,859,097, E. The 7,7-dimethyl-7H-dibenzo[c,h]xanthene diols disclosed in U.S. Pat. Nos. 3,859,254 and 3,902,904, F. The 9,9-dimethylxanthene-3,6-bis(oxyacetic acids) disclosed in *Research Disclosure*, Item No. 9830, June 1972 (anonymous), G. The 4,4'-(3-phenyl-1-indanylidene)diphenols disclosed in *Research Disclosure*, Item No. 13101, March 1975, H. The 4,4'-(hexahydro-4,7-methanoindan-5-ylidene)diphenols disclosed in *Research Disclosure*, Item No. 13568, July 1975, I. The bisphenols disclosed in *Research Disclosure*, Item No. 13569, July 1975,

J. The sulfonyldibenzoic acids disclosed in *Research Disclosure*, Item No. 14016, December 1975, K. The polycyclic norbornanes of *Research Disclosure*, Item No. 9207, December 1971, and L. The 1,2,3,4-tetrahydronaphthalenes disclosed in *Research Disclosure*, Item No. 13570. July 1975.

In some instances, the multicyclic aromatic nucleus compound itself will not have the desired glass transition temperature. In that case, derivatives of these compounds are useful. The compounds described above are bifunctional and can therefore be reacted with reactive compounds to form side chains on the nucleus. Preferred side chain groups are aliphatic groups and aromatic groups which can include substituents such as halogen, cyano or alkoxy; and hetero atom containing groups. These groups are described more completely below in relation to preferred compounds. Preferred compounds are substituted phenylindan compounds and phthalimide compounds described below.

The phenylindan compounds have the structure:

wherein R and $R^1$ are independently selected from the group consisting of nitro, amino, carboxyl, formamido groups, carbamoyl groups and heterocyclic groups derived from amino or carboxyl groups.

Useful formamido and carbamoyl groups are represented by the formulae —$NHCOR^2$ and —$CONR^2R^3$ respectively, wherein $R^2$ and $R^3$ are independently selected from the group consisting of unsubstituted and substituted aliphatic, aromatic and heterocyclic groups such that the molecular weight of the compound is less than about 1000.

Useful aliphatic groups include alkenes such as ethyl, propyl and nonyl; branched aliphatic groups such as 2,2-dimethyl propyl; cycloaliphatic such as cyclohexyl; substituted aliphatic such as aliphatic substituted with halogen, alkoxy, cyano and aromatic groups such as perfluoropropyl, 2-methoxyethyl and phenyl methyl; and unsaturated aliphatic groups such as 2-propenyl and 1-cyclohexenyl.

Useful aromatic groups include phenyl and naphthyl and substituted aromatic such as aromatic substituted with halogen, alkyl, cyano, alkoxy and hydroxy such as 4-methoxy phenyl and 3,4-dichloro phenyl.

Useful heterocyclic groups include pyridyl, furanyl, thiophenyl, quinolyl and piperidyl; and substituted heterocyclic such as heterocyclic substituted with alkyl, halogen and alkoxy such as 5-butylpyridyl.

Heterocyclic groups derived from amino or carboxyl groups are those groups that can be formed by reacting the amino or carboxyl group with another reagent to form the heterocycle. Useful groups therefore include the following, which can be substituted, for example, with aliphatic groups; halogen; alkoxy and nitro:

and

The formamido compounds are made from the starting diamine phenylindan by reaction with the acid chloride corresponding to the desired R group. The acid chloride is made from the corresponding acid by reaction with thionyl chloride. The reaction can take place in a suitable solvent such as a combination of triethylamine in dichloromethane.

The similar carbamoyl compounds are made in a similar manner starting from the phenylindandicarboxylic acid, converting it to the corresponding acid chloride and reacting the acid chloride with the desired amine.

Where R and $R^1$ are different, mixtures of the side chain precursors are used and the compound isolated by liquid chromotography. In preferred embodiments, there is no need to resolve the mixture as it is useful directly.

Exemplary preferred phenylindan compounds are listed in Table I. All of the refractive indices reported in this table and subsequently were measured at 632 nm.

TABLE I

| Compound | R | Refractive Index | Tg °C. |
|---|---|---|---|
| TEL-1 | —CONH₂ | 1.613 | 110 |
| TEL-2 | —NHCO—C₆H₄—OCH₃ | 1.630 | 114 |
| TEL-3 | —NHCO—C₆H₄—Cl | 1.629 | 118 |
| TEL-4 | —NHCO—C₆H₄—Br | 1.647 | 134 |
| TEL-5 | —NHCO—C₆H₄—CN | 1.677 | 138 |
| TEL-6 | —NHCO—C₆H₅ | 1.634 | 114 |
| TEL-7 | —NHCO—C₆H₃Cl₂ | 1.649 | 127 |
| TEL-8 | —NHCO—C₆F₅ | 1.548 | 123 |
| TEL-9 | —NHCO—naphthyl | 1.656 | 133 |
| TEL-10 | —CONH—C₆H₄—Br | 1.659 | 136 |
| TEL-11 | —NHCO—C₆H₅ | 1.569 | 150 |

TABLE I-continued

| Compound | R | Refractive Index | Tg °C. |
|---|---|---|---|
| TEL-12 | —NHCOCH₂C(CH₃)₃ | 1.537 | 112 |
| TEL-13 | —NHCOCH₂CH₂CH₃ | 1.572 | 78 |
| TEL-14 | —NHCOCF₂CF₂CF₃ | 1.472 | 60 |
| TEL-15 | —CON—(C₆H₅)₂ | 1.548 | 99 |
| TEL-16 | —CONHC(CH₃)(CH₃)—CH₂CH₃ | 1.545 | 86 |
| TEL-17 | phthalimide-N— with CH₃ | 1.660 | 128 |
| TEL-18 | Mixture of —NHCO—C₆H₄—Br, —NHCO—naphthyl, and —NHCO—C₆H₄—OCH₃ | 1.654 | 121 |

Preferred phthalimide compounds are disclosed by Machiele et al. U.S. Ser. No. 273,550, filed Nov. 21, 1988, commonly assigned. The phthalimide compounds have the structure:

wherein R and R¹ are as defined above.

The symmetrically substituted compounds, that is R=R¹, are made starting with nitro phthalic anhydride. This is reacted with a nitroaniline to give a dinitro-N-phenyl-phthalimide. This in turn is reduced to the corresponding diamino compound which is then reacted with the oxychloride of the desired side chain.

The similar unsymmetrical compounds are made by reacting the appropriately substituted aniline with the proper nitro-phthalic anhydride followed by reduction to the corresponding amine. The amine is then reacted with the desired acid chloride.

Exemplary phthalimides are listed in Table II.

TABLE II

TEL-19

Index: 1.703
(second sample index = 1.705)
mp: >240°

TEL-20

Index: 1.776
mp: >240°

TEL-21

Index: 1.578
mp: 197–200°

TEL-22

Index: 1.670
mp: >240°

TEL-23

TABLE II-continued

Index: 1.737
mp: >240°

TEL-24

Index: 1.744
(50:50 mixture co-evaporated from sources)

TEL-25

Index: 1.739
mp: 214–222°

TEL-26

Index: 1.751
mp: 231–235°

TEL-27

Index: 1.704
mp: 256–259°

TEL-28

TABLE II-continued mp: >260°

TEL-29

Still other exemplary low molecular weight aromatic compounds useful as transmission enhancement layers in the practice of this invention are listed in Table III.

TABLE III

| Compound | R | Refractive Index |
|---|---|---|
| TEL-30, -31, -32 | —COCH₂C(CH₃)₃ | 1.599 |
| (RHN—⬡—⬡—fluorene—⬡—⬡—NHR) | —H | 1.701 |
| | —CO—⬡—Br | 1.708 |
| TEL-33, -34 | —COCH₂C(CH₃)₃ | 1.572 |
| (tetrabromo bisphenol structure with RO groups) | —OH | 1.659 |
| TEL-35, -36, -37 | —COCH₂C(CH₃)₃ | 1.514 |
| (dimethyl-substituted bisphenol structure with RO groups) | —H | 1.575 |
| | —CO—⬡—Br | 1.610 |

TABLE III-continued

| Compound | R | Refractive Index |
|---|---|---|
| TEL-38, -39, -40  | $-COCH_2C(CH_3)_3$<br>$-H$<br>$-CO-$$-Br$ | 1.578<br>1.755<br>1.731 |

Vacuum vapor deposition of the low molecular weight aromatic compounds can be achieved using any convenient conventional vacuum apparatus. A typical vacuum coating apparatus will include a vacuum chamber which is connected to a mechanical vacuum pump which typically provides a pressure as low as about $10^{-3}$ mm Hg. In addition, a diffusion pump is provided to reduce the vacuum further, typically down to about $10^{-6}$ mm Hg. Inside the chamber, there is provided an evaporation source for the material. The container is typically covered, the cover having an opening to direct the flow of material. The substrate to be coated is usually above the container. The uniformity of the coating can be improved by increasing the distance between container and the support.

A preferred buffer layer corresponding to layers 217 and 317 can be formed of the same composition described above for the transmission enhancement layer, but with from 30 to 90 (preferably 50 to 80) percent by weight of the layer being accounted for by a concurrently deposited metal fluoride or oxide. Alkali metal fluorides and alkaline earth metal fluorides, such as lithium fluoride and magnesium fluoride are preferred. Preferred metal oxides are alkaline earth oxides (e.g., magnesia), rare earth oxides, alumina, and silica. Buffer layers of these compositions are the specific subject matter of Scozzafava et al., concurrently filed, cited above.

The organic nonlinear optical propagation layer can be formed employing conventional techniques and materials. Preferred layers are those which exhibit high ($>10^{-9}$ esu) second order polarization susceptibility, $\chi^{(2)}$, characteristics. Exemplary of useful organic nonlinear optical propagation layers are those disclosed by the following:

NLO-1. Williams, cited above;
NLO-2. Garito U.S. Pat. No. 4,536,450, issued Aug. 20, 1985;
NLO-3. European Patent Application 0,186,999, published Jul. 9, 1986;
NLO-4. Zyss, cited above;
NLO-5 Choe U.S. Pat. No. 4,603,187, issued Jul. 29, 1986;
NLO-6 Choe et al. U.S. Pat. No. 4,707,305, issued Nov. 17, 1987;
NLO-7 Choe et al. U.S. Pat. No. 4,667,042, issued May 19, 1987;
NLO-8 Choe et al. U.S. Pat. No. 4,650,609, issued Mar. 17, 1987;
NLO-9 Choe U.S. Pat. No. 4,579,915, issued Apr. 1, 1986;
NLO-10 DeMartino U.S. Pat. No. 4,720,355, issued Jan. 19, 1988;
NLO-11 Choe et al. U.S. Pat. No. 4,732,783, issued Mar. 22, 1988;
NLO-12 Kobayashi et al., Chemical Physical Letters, Vol. 121, No. 4,5, pp. 356–360, Nov. 15, 1985;
NLO-13 DeMartino U.S. Pat. No. 4,766,171, issued Aug. 23, 1988;
NLO-14 DeMartino et al. U.S. Pat. No. 4,694,066, issued Sept. 15, 1987;
NLO-15 DeMartino et al. U.S. Pat. No. 4,835,235, issued May 30, 1989;
NLO-16 Choe U.S. Pat. No. 4,711,532, issued Dec. 8, 1987;
NLO-17 Choe U.S. Pat. No. 4,694,048, issued Sept. 15, 1987;
NLO-18 Choe U.S. Pat. No. 4,703,096, issued Oct. 27, 1987;
NLO-19 Choe U.S. Pat. No. 4,719,28, issued Jan. 12, 1988;
NLO-20 Milverton et al. U.S. Pat. No. 4,818,616, issued Apr. 4, 1989;
NLO-21 Leslie et al. U.S. Pat. No. 4,796,976, issued Jan. 10, 1989;
NLO-22 Choe U.S. Pat. No. 4,804,255, issued Feb. 14, 1989;
NLO-23 Leslie U.S. Pat. No. 4,801,659, issued Jan. 31, 1989;
NLO-24 Leslie U.S. Pat. No. 4,807,968, issued Feb. 28, 1989;
NLO-25 Teng et al. U.S. Pat. No. 4,775,215, issued Oct. 4, 1988;
NLO-26 Robin et al. U.S. Pat. No. 4,794,045, issued Dec. 27, 1988;
NLO-27 Gillberg LaForce et al. U.S. Pat. No. 4,728,576, issued Mar. 1, 1988;
NLO-28 DeMartino U.S. Pat. No. 4,779,961, issued Oct. 25, 1988;
NLO-29 DeMartino U.S. Pat. No. 4,757,130, issued Jul. 22, 1988;
NLO-30 Choe U.S. Pat. No. 4,824,219, issued Apr. 25, 1989;
NLO-31 Ulman et al., cited above;
NLO-32 DeMartino et al. U.S. Pat. No. 4,808,332, issued Feb. 28, 1989;
NLO-33 Robello et al. U.S. Pat. No. 4,796,971, issued Jan. 10, 1989;
NLO-34 DeMartino et al. U.S. Pat. No. 4,822,865, issued Apr. 18, 1989;
NLO-35 DeMartino et al. U.S. Pat. No. 4,801,670, issued Jan 31, 1989;
NLO-36 Robello European Patent Application 0,313,477, published Apr. 26, 1986.

Specifically preferred organic nonlinear optical layers are those which can be formed by poling linear condensation and vinyl polymers including noncentrosymmetric molecular dipoles as pendant or backbone groups. The molecular dipoles include an electron donor moiety, such as an amino, oxy, or thio group, linked through a conjugated π bonding system to an electron acceptor moiety, such as a sulfonyl, cyano, or nitro group, to permit oscillation of the molecular dipole between a lower polarity ground state and a higher polarity excited state. A preferred conjugated π bonding system is provided by a 4,4'-stilbene or 4,4'-diazobenzene linkage between the electron acceptor or electron donor moiety. The molecular dipole can be linked to the polymer backbone through the electron donor or acceptor moiety or incorporated in the polymer backbone by linkages through both the electron acceptor and donor moieties. Such compounds are specifically illustrated by NLO-31 and NLO-36, listed above.

The formation of organic layers by Langmuir-Blodgett and self assembled monolayer techniques are illustrated by NLO-31. In addition Scozzafava et al. U.S. Ser. No. 101,897, filed Sept. 28, 1987, discloses cross-linking techniques for forming poled organic polymer layers.

The following are illustrative of preferred molecular dipole monomers suitable for producing condensation polymers that can be poled to form the nonlinear optical layers:

TABLE IV

| | |
|---|---|
| NOCM 1 | 4'-{N-[5-(Methoxycarbonyl)pentyl]-N-methyl-amino}-4-(6-hydroxyhexyl)sulfonylazobenzene |
| NOCM 2 | 4'-{N-[5-(Butoxycarbonyl)pentyl]-N-methyl-amino}-4-(6-hydroxyhexyl)sulfonylazobenzene |
| NOCM 3 | 4'-{N-[5-(Methoxycarbonyl)pentyl]-N-methyl amino}-4-(6-hydroxyhexyl)sulfonylstilbene |
| NOCM 4 | 4'-{N-[5 (Butoxycarbonyl)pentyl]-N-methyl amino}-4-(6-hydroxyhexyl)sulfonylstilbene |
| NOCM 5 | 4'-[N-(Methoxycarbonyl)methyl-N-methylamino]-4-(6-hydroxyhexyl)sulfonylazobenzene |
| NOCM 6 | 4'-[N-(Ethoxycarbonyl)methyl-N-methylamino]-4-(6-hydroxyhexyl)sulfonylazobenzene |
| NOCM 7 | 4'-[N-(Methoxycarbonyl)methyl-N-methylamino]-4-(6-hydroxyhexyl)sulfonylstilbene |
| NOCM 8 | 4'-[N-(Ethoxycarbonyl)methyl-N-methylamino]-4-(6-hydroxyhexyl)sulfonylstilbene |
| NOCM 9 | 4'-[N-(6-Hydroxyhexyl)-N-methylamino]-4-[2-(methoxycarbonyl)ethyl]sulfonylazobenzene |
| NOCM 10 | 4'-[N-(6-Hydroxyhexyl)-N-ethylamino]-4-[2-(ethoxycarbonyl)ethyl]sulfonylazobenzene |
| NOCM 11 | 4'-[N-(6-Hydroxyhexyl)-N-methylamino]-4-[2-(methoxycarbonyl)ethyl]sulfonylstilbene |
| NOCM 12 | 4'-[N-(6-Hydroxyhexyl)-N-methylamino]-4-[2-(ethoxycarbonyl)ethyl]sulfonylstilbene |
| NOCM 13 | 4'-[N-(2-Hydroxyethyl)-N-methylamino]-4-[2-(methoxycarbonyl)ethyl]sulfonylazobenzene |
| NOCM 14 | 4'-[N-(2 Hydrxyethyl)-N-methylamino]-4-[2-(ethoxycarbonyl)ethyl]sulfonylazobenzene |
| NOCM 15 | 4'-[N-(2-Hydroxyethyl)-N-methylamino]-4-[2-(methoxycarbonyl)ethyl]sulfonylstilbene |
| NOCM 16 | 4'-[N-(2-Hydroxyethyl)-N-methylamino]-4-[2-(ethoxycarbonyl)ethyl]sulfonylstilbene |
| NOCM 17 | 4'-[N-(2 Hydroxyhexyl)-N-methylamino]-4-[5-(methoxycarbonyl)pentyl]sulfonylazbenzene |
| NOCM 18 | 4'-[N-(2 Hydroxyhexyl)-N-methylamino]-4-[5-(methoxycarbonyl)pentyl]sulfonylstilbene |
| NOCM 19 | 4'-(4-Hydroxy-1-piperidinyl)-4-[2-(methoxycarbonyl)ethyl]sulfonylazobenzene |
| NOCM 20 | 4'-(4-Hydroxy-1-piperidinyl)-4-[2-(methoxycarbonyl)ethyl]sulfonylstilbene |

The following are illustrative of preferred molecular dipole monomers suitable for producing vinyl polymers that can be poled to form the nonlinear optical layers:

TABLE V

| | |
|---|---|
| NOVM 1 | 4'-[N-(2-acryloylxyethyl-N-methylamino]-4-methylsulfonylstilbene |
| NOVM 2 | 4'-[N-(2-methacryloxyethyl-N-methylamino]-4-methylsulfonylstilbene |
| NOVM 3 | 4'-[N-(6 acryoyloxyhexyl)-N-methylamino]-4-methylsulfonylstilbene |
| NOVM 4 | 4'-[N-(6 methacryloyloxyhexyl)-N-methylamino]-4-methylsulfonylstilbene |
| NOVM 5 | 4'-[4-acryloyloxy-1-piperidyl]-4-methylsulfonylstilbene |
| NOVM 6 | 4'-[4-methacryloyloxy-1-piperidyl]-4-methylsulfonylstilbene |
| NOVM 7 | 4'-[N-(2-acryloyloxyethyl)-N-methylamino]-4-phenylsulfonylstilbene |
| NOVM 8 | 4'-[N-(2 methacryloyloxyethyl)-N-methylamino]-4-phenylsulfonylstilbene |
| NOVM 9 | 4'-[N-(6-acryloyloxyhexyl)-N-methylamino]-4-phenylsulfonylstilbene |
| NOVM 10 | 4'-[N-(6-methacryloyloxyhexyl)-N-methylamino]-4-phenylsulfonylstilbene |
| NOVM 11 | 4'-[4-acryloyloxy-1-piperidyl]-4-phenylsulfonylstilbene |
| NOVM 12 | 4'-[4-methacryloyloxy-1-piperidyl]-4-phenylsulfonylstilbene |
| NOVM 13 | 4'-[N-(2-acryloyloxyethyl)-N-methylamino]-4-(R-2-methylbutyl)sulfonylstilbene |
| NOVM 14 | 4'-[N-(2-methacryloyloxyethyl)-N-methylamino]-4-(R-2-methylbutyl)sulfonylstilbene |
| NOVM 15 | 4'-[N-(6-acryloyloxyethyl)-N-methylamino]-4-(R-2-methylbutyl)sulfonylstilbene |
| NOVM 16 | 4'-[N-(6-methacryloyloxyethyl)-N-methylamino]-4-(R-2-methylbutyl)sulfonylstilbene |
| NOVM 17 | 4'-[4-acryloyloxy-1-piperidyl]-4-(R-2-methylbutyl)sulfonylstilbene |
| NOVM 18 | 4'-[4-methacryloyloxy-1-piperidyl]-4-(R-2-methylbutyl)sulfonylstilbene |
| NOVM 19 | 4'-(2-acryloyloxyethoxy)-4-methylsulfonylstilbene |
| NOVM 20 | 4'-(2-methacryloyloxyethoxy)-4-methylsulfonylstilbene |
| NOVM 21 | 4'-(6-acryloyloxyhexoxy)-4-methylsulfonylstilbene |
| NOVM 22 | 4'-(6-methacryloyloxyhexoxy)-4-methylsulfonylstilbene |
| NOVM 23 | 4'-(2-acryloyloxyethoxy)-4-phenylsulfonylstilbene |
| NOVM 24 | 4'-(2-methacryloyloxyethoxy)-4-phenylsulfonylstilbene |
| NOVM 25 | 4'-(6-acryloyloxyhexoxy)-4-phenylsulfonylstilbene |
| NOVM 26 | 4'-(6-methacryloyloxyhexoxy)-4-phenylulfonylsilbene |
| NOVM 27 | 4'-(2-acryloyloxyethoxy)-4-(R-2-methylbutyl)-sulfonylstilbene |
| NOVM 28 | 4'-(2-methacryloyloxyethoxy)-4-(R-2-methylbutyl)sulfonylstilbene |
| NOVM 29 | 4'-(6-acryloyloxyhexoxy)-4-(R-2-methylbutyl)-sulfonylstilbene |
| NOVM 30 | 4'-(6-methacryloyloxyhexoxy)-4-(R-2-methylbutyl)sulfonylstilbene |
| NOVM 31 | 4'-(2-acrylyloxyethylthio)-4-methylulfonylstilbene |
| NOVM 32 | 4'-(2-methacryloyloxyethylthio)-4-methylsulfonylstilbene |
| NOVM 33 | 4'-(6-acryloyloxyhexylthio)-4-methylsulfonylstilbene |
| NOVM 34 | 4'-(6-methacryloyloxyhexylthio)-4-methylsulfonylstilbene |
| NOVM 35 | 4'(2-acryloyloxyethylthio)-4-phenylsulfonylstilbene |
| NOVM 36 | 4'(2-methacryloyloxyethylthio)-4-phenylsulfonylstilbene |
| NOVM 37 | 4'-(6-acryloyloxyhexylthio)-4-phenylsulfonylstilbene |
| NOVM 38 | 4'-(6-methacryloyloxyhexylthio)-4-phenylsulfonylstilbene |
| NOVM 39 | 4'-(2-acryloyloxyethylthio)-4-(R-2-methylbutyl)sulfonylstilbene |
| NOVM 40 | 4'-(2-methacryloyloxyethylthio)-4-(R-2-methylbutyl)sulfonylstilbene |
| NOVM 41 | 4'-(6-acryloyloxyhexylthio-4-(R-2-methylbutyl)sulfonylstilbene |
| NOVM 42 | 4'-(6-methacryloyloxyhexylthio-4-(R-2-methyl- |

TABLE V-continued

| | |
|---|---|
| | butyl)sulfonylstilbene |
| NOVM 43 | 4'-dimethylamino-4-(6-acryloyloxyhexyl)sulfonylstilbene |
| NOVM 44 | 4'-dimethylamino-4-(6-methacryloyloxyhexyl)sulfonylstilbene |
| NOVM 45 | 4'-(1-pyrrolidino)-4-(6-acryloyloxyhexyl)sulfonylstilbene |
| NOVM 46 | 4'-(1-pyrrolidino)-4-(6-methacrylyloxyhexyl)sulfonylstilbene |
| NOVM 47 | 4'-[N-(R-2-methylbutyl)-N-methylamino]-4-(6-acryloyloxyhexyl)sulfonylstilbene |
| NOVM 48 | 4'-[N-(R-2-methylbutyl)-N-methylamino]-4-(6-methacryloyloxyhexyl)sulfonylstilbene |
| NOVM 49 | 4'-methoxy-4-(6-acryloyloxyhexyl)sulfonylstilbene |
| NOVM 50 | 4'-methoxy-4-(6-methacryloyloxyhexyl)sulfonylstilbene |
| NOVM 51 | 4'(R-2-methylbutoxy)-4-(6-acryloyloxyhexyl)sulfonylstilbene |
| NOVM 52 | 4'(R-2-methylbutoxy)-4-(6-methacryloyloxyhexyl)sulfonylstilbene |
| NOVM 53 | 4'-methylthio-4-(6-acryloyloxyhexyl)sulfonylstilbene |
| NOVM 54 | 4'-methylthio-4-(6-methacryloyloxyhexyl)sulfonylstilbene |
| NOVM 55 | 4'-(R-2-methylbutylthio)-4-(6-acryloyloxyhexyl)sulfonylstilbene |
| NOVM 56 | 4'-(R-2-methylbutylthio)-4-(6-methacryloyloxyhexyl)sulfonylstilbene |
| NOVM 57 | 4'-[N-(2-acryloyloxyethyl)-N-methylamino]-4-methylsulfonylazobenzene |
| NOVM 58 | 4'-[N-(2-methacryloyloxyethyl)-N-methylamino]-4-methylsulfonylazobenzene |
| NOVM 59 | 4'[N-(6-acryloyloxyhexyl)-N-methylamino]-4-methylsulfonylazobenzene |
| NOVM 60 | 4'[N-(6-methacryloyloxyhexyl)-N-methylamino]-4-methylsulfonylazobenzene |
| NOVM 61 | 4'-[4-acryloyloxy-1-piperidyl]-4-methylsulfonylazobenzene |
| NOVM 62 | 4'-[4-methacryloylox-1-piperidyl]-4-methylsulfnylazobenzene |
| NOVM 63 | 4'-[N-(2-acryloyloxyethyl)-N-methylamino]-4-phenylsulfonylazobenzene |
| NOVM 64 | 4'-[N-(2-methacryloyloxyethyl)-N-methylamino]-4-phenylsulfonylazobenzene |
| NOVM 65 | 4'-[N-(6-acryloyloxyhexyl)-N-methylamino]-4-phenylsulfonylazobenzene |
| NOVM 66 | 4'-[N-(6-methacryloyloxyhexyl)-N-methylamino]-4-phenylsulfonylazobenzene |
| NOVM 67 | 4'-[4-acryloyloxy-1-piperidyl]-4-phenylsulfonylazobenzene |
| NOVM 68 | 4'-[4-methacryloyloxy-1-piperidyl]-4-phenylsulfonylazobenzene |
| NOVM 69 | 4'-[N-(2-acryloyloxyethyl)-N-methylamino]-4-(R-2-methylbutyl)sulfonylazobenzene |
| NOVM 70 | 4'-[N-(2-methacryloyloxyethyl)-N-methylamino]-4-(R-2-methylbutyl)sulfonylazobenzene |
| NOVM 71 | 4'-[N-(6-acryloyloxyhexyl)-N-methylamino]-4-(R-2-methylbutyl)sulfonylazobenzene |
| NOVM 72 | 4'-[N-(6-methacryloyloxyhexyl)-N-methylamino]-4-(R-2-methylbutyl)sulfonylazobenzene |
| NOVM 73 | 4'-[4-acryloyloxyl-1-piperidyl]-4-(R-2-methylbutyl)sulfonylazobenzene |
| NOVM 74 | 4'-[4-methacryloyloxy-1-piperidyl]-4-(R-2-methylbutyl)sulfonylazobenzene |
| NOVM 75 | 4'-(2-acryloyloxyethoxy)-4-methylsulfonylazobenzene |
| NOVM 76 | 4'-(2-methacryloyloxyethoxy)-4-methylsulfonylazobenzene |
| NOVM 77 | 4'-(6-acryloyloxyhexoxy)-4-methylsulfonylazobenzene |
| NOVM 78 | 4'-(6-methacryloyloxyhexoxy)-4-methylsulfonylazobenzene |
| NOVM 79 | 4'-(2-acryloyloxyethoxy)-4-phenylsulfonylazobenzene |
| NOVM 80 | 4'-(2-methacryloyloxyethoxy)-4-phenylsulfonylazobenzene |
| NOVM 81 | 4'-(6-acryloyloxyhexoxy)-4-phenylsulfonylazobenzene |
| NOVM 82 | 4'-(6-methacryloyloxyhexoxy)-4-phenylsulfonylazobenzene |
| NOVM 83 | 4'-(2-acryloyloxyethoxy)-4-(R-2-methylbutyl)sulfonylazobenzene |
| NOVM 84 | 4'-(2-methacryloyloxyethoxy)-4-(R-2-methylbutyl)sulfonylazobenzene |
| NOVM 85 | 4'-(6-acryloyloxyhexoxy)-4-(R-2-methylbutyl)sulfonylazobenzene |
| NOVM 86 | 4'-(6-methacryloyloxyhexoxy)-4-(R-2-methylbutyl)sulfonylazobenzene |
| NOVM 87 | 4'-(2-acryloyloxyethylthio)-4-methylsulfonylazobenzene |
| NOVM 88 | 4'-(2-methacryloyloxyethylthio)-4-methylsulfonylazobenzene |
| NOVM 89 | 4'-(6-acryloyloxyhexylthio)-4-methylulfonylazobenzene |
| NOVM 90 | 4'-(6-methacryloyloxyhexylthio)-4-methylsulfonylazobenzene |
| NOVM 91 | 4'(2-acryloyloxyethylthio)-4-phenylsulfonylazobenzene |
| NOVM 92 | 4'(2-methacryloyloxyethylthio)-4-phenylsulfonylazobenzene |
| NOVM 93 | 4'-(6-acryloyloxyhexylthio)-4-phenylsulfonylazobenzene |
| NOVM 94 | 4'-(6-methacryloyloxyhexylthio)-4-phenylsulfonylazobenzene |
| NOVM 95 | 4'(2-acryloyloxyethylthio)-4-(R-2-methylbutyl)sulfonylazobenzene |
| NOVM 96 | 4'(2-methacryloyloxyethylthio)-4-(R-2-methylbutyl)sulfnylazobenzene |
| NOVM 97 | 4'-(6-acryloyloxyhexylthio)-4-(R-2-methylbutyl)sulfonylazobenzene |
| NOVM 98 | 4'-(6-methacryloyloxyhexylthio)-4-(R-2-methylbutyl)sulfonylazobenzene |
| NOVM 99 | 4'-dimethylamino-4-(2-acryloyloxyethyl)sulfonylazobenzene |
| NOVM 100 | 4'-dimethylamino-4-(2-methacryloyloxyethyl)sulfonylazobenzene |
| NOVM 101 | 4'-dimethylamino-4-(6-acryloyloxyhexyl)sulfonylazobenzene |
| NOVM 102 | 4'-dimethylamino-4-(6-methacryloyloxyhexyl)sulfonylazobenzene |
| NOVM 103 | 4'-(1-pyrrolidino)-4-(2-acryloyloxyethyl)-sulfonylazobenzene |
| NOVM 104 | 4'-(1-pyrrolidino)-4-(2-methacryloyloxyethyl)sulfonylazobenzene |
| NOVM 105 | 4'-(1-pyrrolidino)-4-(6-acryloyloxyhexyl)-sulfonylazobenzene |
| NOVM 106 | 4'-(1-pyrrolidino)-4-(6-methacryloyloxyhexyl)sulfonylazobenzene |
| NOVM 107 | 4'-dimethylamino-4-(6-acryloyloxyhexyl)-sulfnylazobenzene |
| NOVM 108 | 4'-dimethylamino-4-(6-methacryloyloxyhexyl)-sulfonylazobenzene |
| NOVM 109 | 4'-(1-pyrrolidino)-4-(6-acryloyloxyhexyl)-sulfonylazobenzene |
| NOVM 110 | 4'-(1-pyrrolidino)-4-(6-methacryloyloxyhexyl)-sulfonylazobenzene |
| NOVM 111 | 4'[N-(R-2-methylbutyl)-N-methylamino]-4-(6-acryloyloxyhexyl)sulfonylazobenzene |
| NOVM 112 | 4'[N-(R-2-methylbutyl)-N-methylamino]-4-(6-methacryloyloxyhexyl)sulfonylazobenzene |
| NOVM 113 | 4'-methoxy-4-(6-acryloyloxyhexyl)sulfonylazobenzene |
| NOVM 114 | 4'-methoxy-4-(6-methacryloyloxyhexyl)sulfonylazobenzene |
| NOVM 115 | 4'-(R-2-methylbutoxy)-4-(6-acryloxyhexyl)-sulfonylazobenzene |
| NOVM 116 | 4'-(R-2-methylbutoxy)-4-(6-methacryloxyhexyl)sulfonylazobenzene |
| NOVM 117 | 4'-methylthio-4-(6-acryloxyhexyl)sulfonylazobenzene |
| NOVM 118 | 4'-methylthio-4-(6-methacryloxyhexyl)sulfonylazobenzene |
| NOVM 119 | 4'-(R-2-methylbutylthio)-4-(6-acryloxyhexyl)-sulfonylazobenzene |
| NOVM 120 | 4'-(R-2-methylbutylthio)-4-(6-acryloxyhexyl)sulfonylazobenzene |
| NOVM 121 | 1-(9-julolidinyl)-2-[4-(6-acryloyloxyhexylsulfonyl)phenyl]ethene |
| NOVM 122 | 1-(1-butyl-5-indolinyl)-2-[4-(6-methacryloyloxyhexylsulfonyl)phenyl]diimine] |

The following are illustrative of typical vinyl addition monomers that can be copolymerized with the vinyl molecular dipole monomers of Table V, if desired. The vinyl molecular dipole monomers can form 50 to 100 percent of the repeating units of the polymer, with vinyl addition monmers, such as those of Table VI, below, forming the balance of the repeating units of the polymer.

TABLE VI

| | |
|---|---|
| VCOM 1 | Methyl acrylate |
| VCOM 2 | Ethyl acrylate |
| VCOM 3 | Butyl acrylate |
| VCOM 4 | Butyl acrylate |
| VCOM 5 | Methyl chloroacrylate |
| VCOM 6 | Methyl methacrylate |
| VCOM 7 | Ethyl methacrylate |
| VCOM 8 | Butyl methacrylate |
| VCOM 9 | t-Butylmethacrylate |
| VCOM 10 | Styrene |
| VCOM 11 | 4-Methylstyrene |
| VCOM 12 | α-Methylstyrene |
| VCOM 13 | 4-t-Butylstyrene |
| VCOM 14 | 4 Hydroxystyrene |
| VCOM 15 | 4 Methoxystyrene |
| VCOM 16 | 4 Acetoxystyrene |
| VCOM 17 | 2 Vinylnaphthylene |
| VCOM 18 | Acrylonitrile |
| VCOM 19 | Acrylamide |
| VCOM 20 | N-Phenylmaleimide |
| VCOM 21 | N-Vinylpyrrolidone |
| VCOM 22 | Vinylacetate |
| VCOM 23 | Vinylchloride |
| VCOM 24 | Butadiene |
| VCOM 25 | Isoprene |
| VCOM 26 | Chloroprene |

Conventional details of device fabrication are also taught by the foregoing NLO citations.

EXAMPLES

The following examples illustrate preferred embodiments of the invention:

Example 1

Onto an indium tin oxide (ITO) coated glass plate was spin coated a solution containing 2.5 g of a linear vinyl homopolymer of NOVM-60 ($T_g$ 100° C., refractive index 1.758) dissolved in 10 mL of trichloropropane. To solution was added one half drop of a commercial nonionic fluorocarbon surfactant available under the tradename FC-170C. The solution was then filtered through a 0.2 μm Millipore ™ filter and spread over the entire surface of the ITO glass plate, which was mounted for spin coating. After saturating the ITO surface with the polymer solution, the plate was spun at 500 revolutions per minute (rpm). The resulting sample was then placed in a vacuum oven at 120° C. overnight. Up to this point a device sub-assembly had been prepared consisting of a poling electrode and an organic layer for the nonlinear propagation of electromagnetic radiation.

The sub-assembly was removed from the oven and placed in a vacuum chamber. In the vacuum chamber a low molecular weight phenylindan compound (TEL-11) was placed in a quartz boat for thermal evaporation. At a pressure of $10^{-6}$ mm Hg the boat was resistively heated and the phenylindan was evaporated onto the surface of the organic layer to form a transmission enhancing layer.

Onto the transmission enhancing layer was evaporated a gold electrode forming layer employing a similar evaporation technique as that employed for depositing TEL 11.

The final form of the device with the thickness of each layer is shown below:

| |
|---|
| Gold (500Å) |
| TEL 11 (2.0 μm) |
| Homopolymer of |
| NOVM-60 (2.4 μm) |
| ITO (200Å) |
| Glass Plate |

The organic layer was then poled as follows:

A voltage of 450 volts was applied while heating to a temperature of 101° C. The device with the voltage applied was held at this temperature for 2 hours and then allowed to cool to room temperature with the voltage still applied.

The resulting poled exhibited a second order polarization susceptibility, $\chi^{(2)}$, of $1.2 \times 10^{-6}$ electrostatic units (esu). This corresponds to an electro optic coefficient of 53 picometers per volt (pm/V).

When employed as a waveguide, the device can be expected to exhibit low levels of light loss of less than 5 dB/cm. Without the transmission enhancement layer the corresponding device would exhibit light losses increased by 2 to 3 orders of magnitude.

Example 2

Employing procedures similar to those described in Example 1 onto the poling electrode formed as described in Example 1 was deposited 2.0 μm coating of a linear copolymer of NOVM-3 and VCOM-6 ($T_g$ 109° C., refractive index 1.52). Over the polymer layer was evaporated a 2.0 μm transmission enhancement layer of TEL-22.

The transmission enhancement layer was amorphous and transparent in the visible portion of the spectrum. The polymer and transmission enhancement layers were observed to remain defect free following thermal cycling to simulate somewhat more rigorous conditions than would actually be encountered in use as an optical device.

Example 3

Onto a glass plate coated with 250Å of ITO were deposited 2000Å of $SiO_2$ at the rate of 1-2Å/sec. The silica deposition was done in vacuum at a pressure of about $10^{-6}$ mm Hg using a conventional electron beam source.

After silica deposition, the polymer of Example 2 was deposited by the procedure of that example to produce a layer having a thickness of 1.25 μm.

A transmission enhancement layer was then formed by depositing a 1.0 μm layer of TEL-11 by the procedure described in Example 1.

Onto the transmission enhancement layer was deposited a magnesium indium alloy electrode in the following manner: In a vacuum chamber a boat containing indium was heated so that its deposition rate onto the transmission enhancement layer was about 1Å/sec. Another boat containing magnesium, isolated from the indium boat, was heated to bring to the combined deposition rate up to 10Å/sec.

Poling was performed similarly as described in Example 1.

The final form of the device with the thickness of each layer is shown below:

| |
|---|
| Mz:In (2200Å) |
| TEL 11 (1.0 μm) |
| Copolymer of |
| NOVM-60 + VCOM-6 (1.3 μm) |
| Silica (2000Å) |
| ITO (200Å) |
| Glass Plate |

Figure 4:
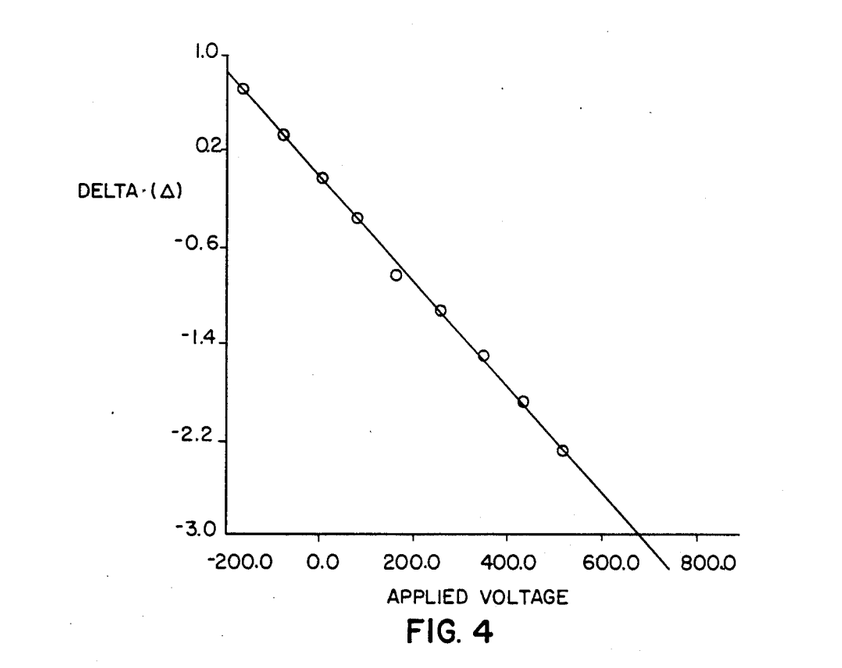
FIG. 4 is a plot of applied voltage against the phase shift difference ($\Delta$) in p- and s- polarization.

The electro-optic response of the device was measured with the use of an ellipsometer. Polarized coherent light of a wavelength of 632 nm was beamed into the device through the glass plate and ITO electrode, reflected by the Mg:In electrode, and measured using by ellipsometry. The parameter Δ was measured, which is the difference in the phase shift that p- and s- polarized light undergo upon reflection as described, where p- and s- polarization refer to light with its electric field parallel and perpendicular to the plane of incidence, respectively. The change in Δ as a function of voltage applied across the electrodes is shown graphically in FIG. 4, wherein a positive voltage difference reflects a more positive voltage at the Mg:In electrode compared to the ITO electrode. The linear response corroborates the electro-optic properties imparted by the transmission enhancement layer.

The electro-optic response of the device was estimated to be greater than $10^{-7}$ esu. When employed as a waveguide, the device can be expected to exhibit low levels of light loss of less than 5 dB/cm. Without the transmission enhancement layer the corresponding device would exhibit light losses increased by 2 to 3 orders of magnitude.

The invention has been described in detail with particular reference to preferred embodiments thereof, but it will be understood that variations and modifications can be effected within the spirit and scope of the invention.

APPENDIX

App. Ex. 1: Preparation of 4-(4-bromophenylcarbon-amido)-n-(3-[4-bromophenylcarbonamido]-phenyl)phthalimide A solution of 4-nitrophthalic anhydride (24.6 g., 0.127 mole) and 3 nitroaniline (17.5 g. 0.127 mole) in acetonitrile (300 ml) was heated at reflux for 84 hours, cooled and filtered. The solid was washed with cold acetonitrile, dissolved in acetic anhydride (200 ml), and heated at reflux for 3 hours. The reaction mixture was collected, the solid filtered and rinsed with acetonitrile and dried. Yield of N-(3-nitrophenyl)-4-nitrophthalimide was 20.6 g. (51.7%); m.p. 245–246°. Calcd. for $C_{14}H_7N_3O_6$: C, 53.7; H, 2.3; N, 13.4. Found: C, 53.6; H, 2.5; N, 13.5.

A solution of N-(3-nitrophenyl)-4-nitro phthalimide (5.0 g. ) in tetrahydrofuran (300 ml) was reduced under hydrogen (45 psi) using platinum oxide catalyst (0.2 g.) for 18 hours. The solution was dried ($MgSO_4$), filtered through Celite, and the solvent evaporated under reduced pressure to yield 4-amino-N-(3-aminophenyl)phthalimide; 3.8 g. (93.1%); M.P. 228–231°. Calcd. for $C_{14}H_{11}N_3O_2$: C, 66.4; H, 4.4; N, 16.6. Found: C, 66.9; H, 4.9; N, 16.0.

To a stirred solution of 4-amino-N-(3-aminophenyl)phthalimide (4.0 g., 0.016 mole) and triethylamine (3.6 g., 0.036 mole) in tetrahydrofuran (300 ml) was added dropwise a solution of 4-bromobenzoyl chloride (7.4 g., 0.034 mole) in tetrahydrofuran (50 ml). After 1 hour the solution was filtered and the solvent was removed from the filtrate under reduced pressure. After several recrystallizations from a variety of solvents, a fluorescent impurity still remained. The solid was finally stirred in hot dichloromethane for several hours, filtered and dried in a vacuum oven overnight. TLC showed no more fluorescent impurity. Yield 2.22 g. (22.4%), m.p. >240°. Calcd. for $C_{28}H_{17}Br_2N_3O_4$: C, 54.3; H, 2.8; N, 6.8. Found: C, 52.1; H, 2.4; N, 6.3.

What is claimed is:

1. An optical article comprised of an organic layer for the nonlinear propagation of electromagnetic radiation and a transmission enhancement layer contiguously overlying said organic layer, characterized in that said transmission enhancement layer is an amorphous layer of at least 0.5 μm in thickness transmissive to the nonlinearly propagated electromagnetic radiation, exhibiting a refractive index less than that of said organic layer, and comprised of a low molecular weight aromatic compound.

2. An optical article according to claim 1 further characterized in that an electrode is located beneath said organic layer.

3. An optical article according to claim 2 further characterized in that an insulative buffer layer is interposed between said electrode and said organic layer.

4. An optical article according to claim 1 further characterized in that an electrode is located on said transmission enhancement layer.

5. An optical article according to claim 1 further characterized in that said organic layer exhibits a glass transition temperature of at least 50° C.

6. An optical article according to claim 1 further characterized in that said transmission enhancement layer exhibits a glass transition temperature of at least 50° C.

7. An optical article according to claim 1 further characterized in that said transmission enhancement layer exhibits a thickness in the range of from 1 to 10 μm.

8. An optical article according to claim 7 further characterized in that said transmission enhancement layer exhibits a thickness in the range of from 1 to 5 μm.

9. An optical article according to claim 1 further characterized in that said organic layer exhibits a second order polarization susceptibility of greater than $10^{-9}$ electrostatic units.

10. An optical article containing an organic layer exhibiting a second order polarization susceptibility of greater than $10^{-9}$ electrostatic units for the conversion of electromagnetic radiation of a first wavelength to its second harmonic wavelength and transmission of both wavelengths and a transmission enhancement layer contiguously overlying said organic layer, characterized in that said transmission enhancement layer is an amorphous vacuum vapor deposited layer of from 1 to 10 μm in thickness transmissive to electromagnetic radiation of said first and harmonic wavelengths exhibiting a refractive index less than that of said organic layer and comprised of a low molecular weight aromatic compound exhibiting a glass transition temperature of at least 50° C.

11. An optical device according to claim 10, further characterized in that said aromatic compound is a phenylindan compound of the structure:

wherein R and $R^1$ are independently selected from the group consisting of nitro, amino, carboxyl, formamido groups, carbamoyl groups and heterocyclic groups derived from amino or carboxyl groups.

12. An optical device according to claim 10, further characterized in that said aromatic compound is a phthalimide compound of the structure:

wherein R and $R^1$ are independently selected from the group consisting of nitro, amino, carboxyl, formamido groups, carbamoyl groups and heterocyclic groups derived from amino or carboxyl groups.

* * * * *